(12) United States Patent
Isono (10) Patent No.: US 8,016,306 B2
(45) Date of Patent: Sep. 13, 2011

(54) VEHICULAR SUSPENSION

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 18 days.

(21) Appl. No.: 12/518,215

(22) PCT Filed: Nov. 30, 2007

(86) PCT No.: PCT/JP2007/073630
§ 371 (c)(1),
(2), (4) Date: Jun. 8, 2009

(87) PCT Pub. No.: WO2008/069293
PCT Pub. Date: Jun. 12, 2008

(65) Prior Publication Data
US 2010/0090433 A1 Apr. 15, 2010

(30) Foreign Application Priority Data
Dec. 8, 2006 (JP) ................................. 2006-332367

(51) Int. Cl.
*B60G 3/18* (2006.01)
(52) U.S. Cl. .... 280/124.135; 280/124.136; 280/124.139
(58) Field of Classification Search ........... 280/124.134, 280/124.136, 124.139
See application file for complete search history.

(56) References Cited

U.S. PATENT DOCUMENTS

| | | | | |
|---|---|---|---|---|
| 6,017,044 A | * | 1/2000 | Kawagoe | 280/124.106 |
| 6,105,984 A | * | 8/2000 | Schmitz et al. | 280/124.136 |
| 6,390,484 B1 | * | 5/2002 | Green et al. | 280/124.106 |
| 6,695,329 B2 | * | 2/2004 | Handa | 280/124.135 |
| 7,281,716 B2 | * | 10/2007 | Fanson | 280/5.52 |
| 7,392,978 B2 | * | 7/2008 | Carlitz et al. | 267/221 |
| 7,625,000 B2 | * | 12/2009 | Campbell | 280/124.133 |

(Continued)

FOREIGN PATENT DOCUMENTS

DE 454 730 1/1928

(Continued)

OTHER PUBLICATIONS

Office Action issued Sep. 24, 2010, in German Patent Application No. 11 2007 002 937.4-21 with English translation.

*Primary Examiner* — Toan C To
(74) *Attorney, Agent, or Firm* — Oblon, Spivak, McClelland, Maier & Neustadt, L.L.P.

(57) ABSTRACT

A suspension including a first support member and a second support member supporting an end portion of a suspension spring located on a side toward a vehicle body and an end portion of the suspension spring located on a side toward a suspension member, respectively, and a motion transmission mechanism adapted to convert a vertical motion of the suspension member to a relative motion in a form of a change in distance between the first support member and the second support member and to transmit the relative motion to one of the first and second support members. The transmission mechanism continuously and nonlinearly varies the ratio of the amount of motion of a motion transmission target to the amount of motion of a motion transmission source according to motion of the motion transmission source, thereby continuously and nonlinearly varying the ratio of the amount of the relative motion to the amount of motion of the suspension member according to the vertical motion of the suspension member.

14 Claims, 6 Drawing Sheets

U.S. PATENT DOCUMENTS

| | | | |
|---|---|---|---|
| 7,661,689 B2 * | 2/2010 | Kinugasa | 280/124.135 |
| 7,740,256 B2 * | 6/2010 | Davis | 280/124.157 |
| 2005/0067798 A1 | 3/2005 | Uchiyama et al. | |

FOREIGN PATENT DOCUMENTS

| | | |
|---|---|---|
| JP | 59 155212 | 10/1984 |
| JP | 61 68908 | 5/1986 |
| JP | 3 132413 | 6/1991 |
| JP | 6 71934 | 10/1994 |
| JP | 7 11403 | 2/1995 |
| JP | 2005 67386 | 3/2005 |
| JP | 2005 126058 | 5/2005 |
| JP | 2005 265158 | 9/2005 |

* cited by examiner

VEHICULAR SUSPENSION

TECHNICAL FIELD

The present invention relates to a vehicular suspension and, more particularly, to a vehicular suspension which has progressive spring characteristics in relation to vertical strokes of a wheel.

BACKGROUND ART

Preferably, a vehicular suspension for use in an automobile or the like has progressive spring characteristics in relation to bounds of a wheel. Conventionally, suspensions having such progressive spring characteristics have been proposed in various configurations. For example, Japanese Utility Model Application Laid-Open (kokai) No. H7-11403 describes a suspension shock absorber for imparting, to a suspension, progressive spring characteristics in relation to bound strokes from a neutral position of a wheel.

Like a suspension equipped with the above-mentioned suspension shock absorber, a conventional suspension which has progressive spring characteristics in relation to bound strokes of a wheel includes a plurality of springs of different fixed spring constants and functions such that the springs generate spring forces in different respective regions of a bound stroke of a wheel. Accordingly, the relation of spring forces to a bound stroke of a wheel is a discontinuously nonlinear relation; in other words, the relation fails to exhibit preferred continuous nonlinearity.

Also, the conventional suspension having progressive spring characteristics exhibits progressive spring characteristics in relation to bound strokes of a wheel, but fails to exhibit progressive spring characteristics in relation to rebound strokes of a wheel. Generally, rebounds of a wheel are restrained by means of a rebound stopper. Accordingly, when a wheel rebounds with a high stroke velocity, the rebound of the wheel is abruptly restrained by the rebound stopper, so that generation of shock is unavoidable.

Furthermore, in the conventional suspension, vertical motions of a wheel associated with bounds and rebounds of the wheel are transmitted to a suspension spring via a link mechanism which includes suspension members, such as a suspension arm, thereby elastically deforming the suspension spring. Thus, elastic deformation of the suspension spring is subjected to restrictions associated with motion transmission via the link mechanism; consequently, spring force characteristics in relation to bound and rebound strokes of a wheel are subjected to restrictions associated with motion transmission via the link mechanism.

DISCLOSURE OF THE INVENTION

A primary object of the present invention is to provide a vehicular suspension in which vertical motions of a wheel associated with bounds and rebounds of the wheel are transmitted to a suspension spring in such a manner that the rate of change in the amount of elastic deformation of the suspension spring associated with vertical strokes of the wheel varies gradually, thereby exhibiting desired progressive spring characteristics in relation to strokes, preferably both bound strokes and rebound strokes, of the wheel without subjection to restrictions associated with motion transmission via a link mechanism of the suspension.

The present invention provides a vehicular suspension having a suspension member which moves upward and downward in association with bound and rebound, respectively, of a wheel, a suspension spring disposed between a vehicle body and the suspension member, a first support member and a second support member for supporting an end portion of the suspension spring located on a side toward the vehicle body and an end portion of the suspension spring located on a side toward the suspension member, respectively, and motion transmission means for varying an amount of elastic deformation of the suspension spring by means of converting a vertical motion of the suspension member to a relative motion in the form of a change in distance between the first support member and the second support member and transmitting the relative motion to one of the first support member and the second support member. The motion transmission means includes first transmission means and second transmission means. The first transmission means transmits the vertical motion of the suspension member to the second transmission means. The second transmission means transmits a motion transmitted from the first transmission means, to one of the first support member and the second support member. At least one of the first transmission means and the second transmission means continuously and nonlinearly varies a ratio of an amount of motion of a motion transmission target member to an amount of motion of a motion transmission source member according to motion of the motion transmission source member, thereby continuously and nonlinearly varying a ratio of an amount of the relative motion to an amount of motion of the suspension member according to the vertical motion of the suspension member.

According to this configuration, the rate of change in the amount of elastic deformation of the suspension spring can be varied continuously and nonlinearly according to strokes of a wheel, whereby characteristics of spring force of the suspension in relation to strokes of the wheel can be set to desired progressive spring characteristics.

The above-mentioned configuration may be such that: at least one of the first transmission means and the second transmission means continuously and nonlinearly increases the ratio of the amount of motion of the motion transmission target member to the amount of motion of the motion transmission source member with the amount of motion of the motion transmission source member.

According to this configuration, in the process of the first and second transmission means transmitting the vertical motion of the suspension member to one of the first and second support members, the ratio of the amount of relative motion between the first and second support members to the amount of motion of the suspension member can be reliably increased continuously and nonlinearly with the amount of motion of the suspension member.

The above-mentioned configuration may be such that: a position of the suspension member at the time of the wheel being positioned at a neutral position is taken as a standard position, and, in both upward motion and downward motion from the standard position of the suspension member, the motion transmission means continuously and nonlinearly increases the ratio of the amount of the relative motion to the amount of motion of the suspension member with the amount of motion of the suspension member.

According to this configuration, in both a bound stroke and a rebound stroke from the neutral position of the wheel, the ratio of the amount of the relative motion between the first and second support members to a stroke of the wheel can be increased continuously and nonlinearly with the stroke of the wheel. Thus, in both a bound stroke and a rebound stroke of the wheel, the rate of change in spring force of the suspension spring can be increased continuously and nonlinearly with a stroke of the wheel.

The above-mentioned configuration may be such that: the motion transmission means has an input member, an intermediate member, and an output member which are fitted to one another while being aligned with an axis and move in relation to one another while being aligned with the axis; the vertical motion of the suspension member causes the input member to move rectilinearly along the axis; the first transmission means converts a rectilinear motion along the axis of the input member to a rotary motion about the axis and transmits the rotary motion to the intermediate member; the second transmission means converts the rotary motion about the axis of the intermediate member to a rectilinear motion along the axis and transmits the rectilinear motion to the output member; and the output member transmits the rectilinear motion along the axis to one of the first support member and the second support member.

According to this configuration, the input member, the intermediate member, and the output member are fitted to one another while being aligned with an axis and move in relation to one another while being aligned with the axis. Thus, as compared with a structure in which the input member and the output member move rectilinearly along mutually different axes and a structure in which the input member or the output member is not fitted to the intermediate member, the axial length of the motion conversion transmission apparatus can be reduced, whereby the motion conversion transmission apparatus can be reliably rendered compact.

Also, according to this configuration, while the ratio of the mount of rectilinear motion of the output member to the amount of rectilinear motion of the input member is reliably varied continuously and nonlinearly according to the amount of rectilinear motion of the input member, the rectilinear motion of the input member can be transmitted to the output member in the form of a rectilinear motion. Thus, the ratio of the amount of the relative motion between the first and second support members to the amount of motion of the suspension member can be reliably increased continuously and nonlinearly with the amount of motion of the suspension member.

The above-mentioned configuration may be such that: when the wheel is positioned at the neutral position, the input member, the intermediate member, and the output member are positioned at their standard positions; the first transmission means is configured to continuously and nonlinearly increase a ratio of an amount of rotary motion of the intermediate member to an amount of rectilinear motion of the input member with the amount of rectilinear motion from the standard position of the input member; and the second transmission means is configured to continuously and nonlinearly increase a ratio of an amount of rectilinear motion of the output member to the amount of rotary motion of the intermediate member with the amount of rotary motion from the standard position of the intermediate member.

According to this configuration, as compared with a structure in which only one of the first transmission means and the second transmission means increases the ratio between the amounts of motion continuously and nonlinearly, there can be reduced the amount of increase in the ratio between the amounts of motion which is to be achieved by each of the first transmission means and the second transmission means.

The above-mentioned configuration may be such that: each of the first transmission means and the second transmission means has a cam provided in the motion transmission source member and a cam follower provided in the motion transmission target member and engaged with the cam, and, by means of the cam follower following a profile of the cam, the ratio of the amount of motion of the motion transmission target member to the amount of motion of the motion transmission source member is varied continuously and nonlinearly according to the amount of motion of the motion transmission source member.

According to this configuration, the ratio of the amount of motion of the motion transmission target member to the amount of motion of the motion transmission source member can be reliably increased continuously and nonlinearly with the amount of motion of the motion transmission source member. Also, characteristics of spring force of the suspension in relation to bound and rebound strokes of the wheel can be set to desired continuous nonlinear characteristics through setting of the cam and the cam follower.

The above-mentioned configuration may be such that: one of the cam and the cam follower is a cam groove, whereas the other of the cam and the cam follower is a cam groove engagement member which is engaged with the cam groove and moves along the cam groove, and the cam groove of at least one of the first transmission means and the second transmission means extends while being inclined with respect to a circumferential direction about the axis and is curved such that an angle of inclination with respect to the circumferential direction varies gradually and continuously.

According to this configuration, by means of the cam groove engagement member engaged with the cam groove moving along the cam groove, the ratio of the amount of motion of the motion transmission target member to the amount of motion of the motion transmission source member can be increased continuously and nonlinearly according to the amount of motion of the motion transmission source member. Thus, characteristics of spring force of the suspension in relation to bound and rebound strokes of the wheel can be set to desired continuous nonlinear characteristics through setting of the shape of curve of the cam groove.

The above-mentioned configuration may be such that: the motion transmission means has a housing for accommodating the input member and the intermediate member therein; the intermediate member is fitted to the input member in such a manner as to surround the input member about the axis, and supports the input member in such a manner that the input member is rectilinearly movable along the axis; the housing is fitted to the intermediate member in such a manner as to surround the intermediate member about the axis, and supports the intermediate member in such a manner that the intermediate member is rotatable about the axis; the output member is fitted to the housing in such a manner as to surround the housing about the axis, and is supported by the housing in such a manner as to be rectilinearly movable along the axis; the first transmission means and the second transmission means have a first cam groove and a second cam groove, respectively, provided in the intermediate member; the cam groove engagement member of the first transmission means and the cam groove engagement member of the second transmission means are provided in the input member and the output member, respectively; the housing has a first guide groove and a second guide groove which extend along the axis; the cam groove engagement member of the first transmission means extends radially outward through the first cam groove and into the first guide groove and is engaged with the first guide groove in such a manner as to be movable along the first guide groove; and the cam groove engagement member of the second transmission means extends radially inward through the second guide groove and into the second cam groove and is engaged with the second guide groove in such a manner as to be movable along the second guide groove.

According to this configuration, as compared with a structure in which the input member and the output member move rectilinearly along mutually different axes and a structure in which the input member, the output member, the intermediate member, and the housing are not fitted to one another, the axial length of the motion transmission means can be reduced, whereby the motion transmission means can be rendered compact.

Also, according to this configuration, the cam groove engagement member of the first transmission means and the cam groove engagement member of the second transmission means can be reliably guided along the axis by the respective guide grooves. Thus, as compared with a structure in which the housing does not have the guide grooves, the conversion of motion can be smoothly carried out between a rectilinear motion of the input member and a rotary motion of the intermediate member and between a rotary motion of the intermediate member and a rectilinear motion of the output member.

Also, according to this configuration, in association with the conversion of motion between a rectilinear motion of the input member and a rotary motion of the intermediate member and the conversion of motion between a rotary motion of the intermediate member and a rectilinear motion of the output member, the housing can partially bear circumferential stress about the axis imposed on the cam groove engagement members of the first and second transmission means. Accordingly, as compared with a structure in which the housing does not have the first and second guide grooves, improvement can be achieved in the durability of the motion transmission means.

The above-mentioned configuration may be such that: as viewed in a range of vertical motion of the suspension member excluding a terminal area of upward motion and a terminal area of downward motion of the suspension member, a rate of increase in the ratio between the amounts of motion in a case of upward motion from the standard position of the suspension member is lower than a rate of increase in the ratio between the amounts of motion in a case of downward motion from the standard position of the suspension member.

According to this configuration, in a range in which the stroke of a wheel is not long, the rate of increase in spring force at the time of bound of the wheel is lower than the rate of decrease in spring force at the time of rebound of the wheel. Accordingly, as compared with the case where the magnitude relation with respect to the rate of increase in the ratio between the amounts of motion in the cases of upward and downward motions from the standard position of the suspension member is the reverse of the above-mentioned magnitude relation, while a spring force functioning as a rebound acceleration force at the time of rebound of the wheel is reduced to thereby effectively restrain a postural change of a vehicle body at the time of turning and acceleration and deceleration, a spring force which functions as resistance at the time of bound of the wheel caused by a force from the surface of road is reduced, whereby good riding comfort of vehicle can be ensured.

The above-mentioned configuration may be such that: as viewed in the terminal area of upward motion and the terminal area of downward motion of the suspension member, the rate of increase in the ratio between the amounts of motion in the case of upward motion from the standard position of the suspension member is higher than the rate of increase in the ratio between the amounts of motion in the case of downward motion from the standard position of the suspension member.

According to this configuration, an excessive bound of the wheel can be effectively restrained, so that the size of a bound stopper can be reduced, or the bound stopper can be eliminated. Also, when the wheel bounds with a high stroke velocity, a shock caused by hitting against the bound stopper can be reduced.

The above-mentioned configuration may be such that: one of the input member and the output member serves as a cylinder of a shock absorber, and the motion transmission means has the shock absorber incorporated therein.

According to this configuration, the motion transmission means and the shock absorber can be attached in the form of a single unit to a vehicle. Thus, as compared with a structure in which the shock absorber is not incorporated in the motion transmission means, improvement can be achieved in the mountability of the motion transmission means and the shock absorber in the vehicle.

The above-mentioned configuration may be such that: the suspension spring is disposed in a compressed condition between the first support member and the second support member; the output member moves rectilinearly in a direction opposite that of the input member; and the output member transmits a rectilinear motion to the first support member.

According to this configuration, by means of rectilinearly moving the first support member in relation to the second support member in an opposite direction of vertical motion of the wheel and the suspension member, the ratio of the amount of relative motion between the first and second support members to the amount of motion of the suspension member can be increased continuously and nonlinearly with the amount of motion of the suspension member.

The above-mentioned configuration may be such that: the first support member is integrated with the output member, and the second support member is integrated with the input member.

According to this configuration, as compared with a structure in which the first support member and the second support member are separated from the output member and the input member, respectively, the number of components of the suspension can be reduced, whereby assembly of the suspension can be facilitated.

The above-mentioned configuration may be such that: the suspension spring is disposed in a compressed condition between the first support member and the second support member; the output member moves rectilinearly in the same direction as that of the input member; and the output member transmits a rectilinear motion to the second support member.

According to this configuration, by means of rectilinearly moving the second support member in relation to the first support member in the same direction as that of vertical motion of the wheel and the suspension member, the ratio of the amount of relative motion between the first and second support members to the amount of motion of the suspension member can be increased continuously and nonlinearly with the amount of motion of the suspension member.

The above-mentioned configuration may be such that: the first support member is supported by a vehicle body, and the second support member is integrated with the output member.

According to this configuration, as compared with the case where the second support member is separated from the output member, the number of components of the suspension can be reduced, whereby assembly of the suspension can be facilitated.

The above-mentioned configuration may be such that: when the wheel is positioned at the neutral position, the wheel rate is minimized, and, as a bound stroke and a rebound stroke from the neutral position of the wheel increase, the wheel rate gradually increases.

The above-mentioned configuration may be such that: both the first transmission means and the second transmission means continuously and nonlinearly increase the ratio of the amount of motion of the motion transmission target member to the amount of motion of the motion transmission source member with the amount of motion of the motion transmission source member.

The above-mentioned configuration may be such that: the rate of increase in the ratio of the amount of motion of the output member to the amount of motion of the intermediate member in association with increase in the amount of motion of the input member is higher than the rate of increase in the ratio of the amount of motion of the intermediate member to the amount of motion of the input member in association with increase in the amount of motion of the input member.

The above-mentioned configuration may be such that: a plurality of first cam grooves and a plurality of cam groove engagement members are provided while being spaced apart from one another at equal intervals around the axis.

The above-mentioned configuration may be such that: a plurality of guide grooves are provided while being spaced apart from one another around the axis.

The above-mentioned configuration may be such that: as viewed in a range of stroke of the wheel excluding the terminal area of bound stroke and the terminal area of rebound stroke of the wheel, the rate of increase in wheel rate in association with increase in bound stroke of the wheel is lower than the rate of increase in wheel rate in association with increase in rebound stroke of the wheel.

The above-mentioned configuration may be such that: as viewed in the terminal area of bound stroke and the terminal area of rebound stroke of the wheel, the rate of increase in wheel rate in association with increase in bound stroke of the wheel is higher than the rate of increase in wheel rate in association with increase in rebound stroke of the wheel.

The above-mentioned configuration may be such that: the rate of increase in the amount of compressive deformation of the suspension spring is increased with the amount of upward motion from the standard position of the suspension member, and the rate of decrease in the amount of compressive deformation of the suspension spring is increased with the amount of downward motion from the standard position of the suspension member.

The above-mentioned configuration may be such that: the first and second cam groove engagement members have first and second shaft members, respectively, which are fixed to the input member and the output member, respectively, and extend in a radial direction, and first and second cam rollers, respectively, which are rotatably supported by the first and second shaft members, respectively, and are rollably engaged with wall surfaces of the first and second cam grooves, respectively.

The above-mentioned configuration may be such that: the first and second cam groove engagement members have first and second guide rollers, respectively, which are rotatably supported by the first and second shaft members, respectively, and are rollably engaged with wall surfaces of the first and second guide grooves, respectively.

BEST MODE FOR CARRYING OUT THE INVENTION

A preferred embodiment of the present invention will next be described in detail with reference to the appended drawings.

Figure 1:
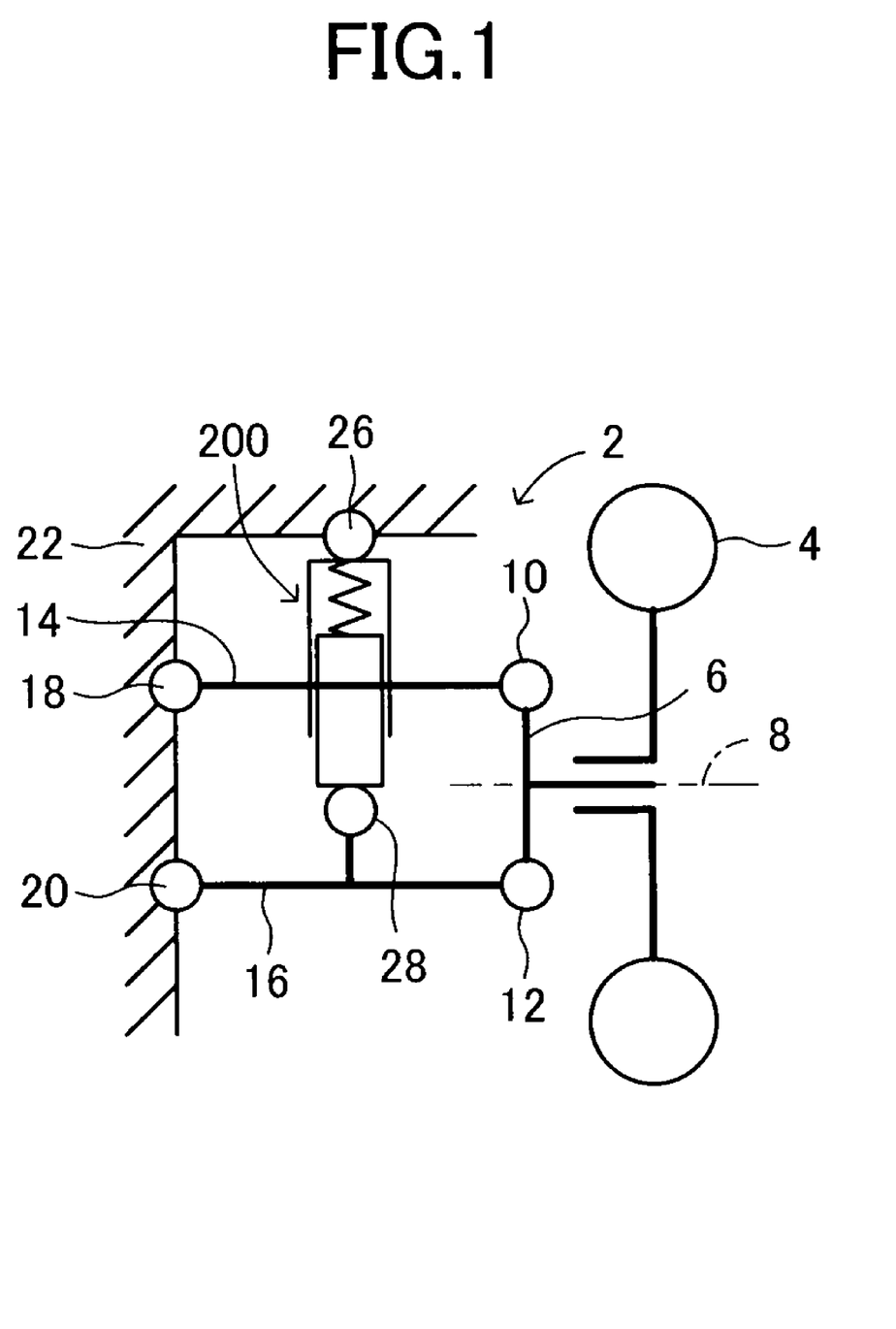
FIG. 1 is an explanatory view showing an embodiment of a vehicular suspension according to the present invention and configured as a double-wishbone-type suspension.
Figure 2:
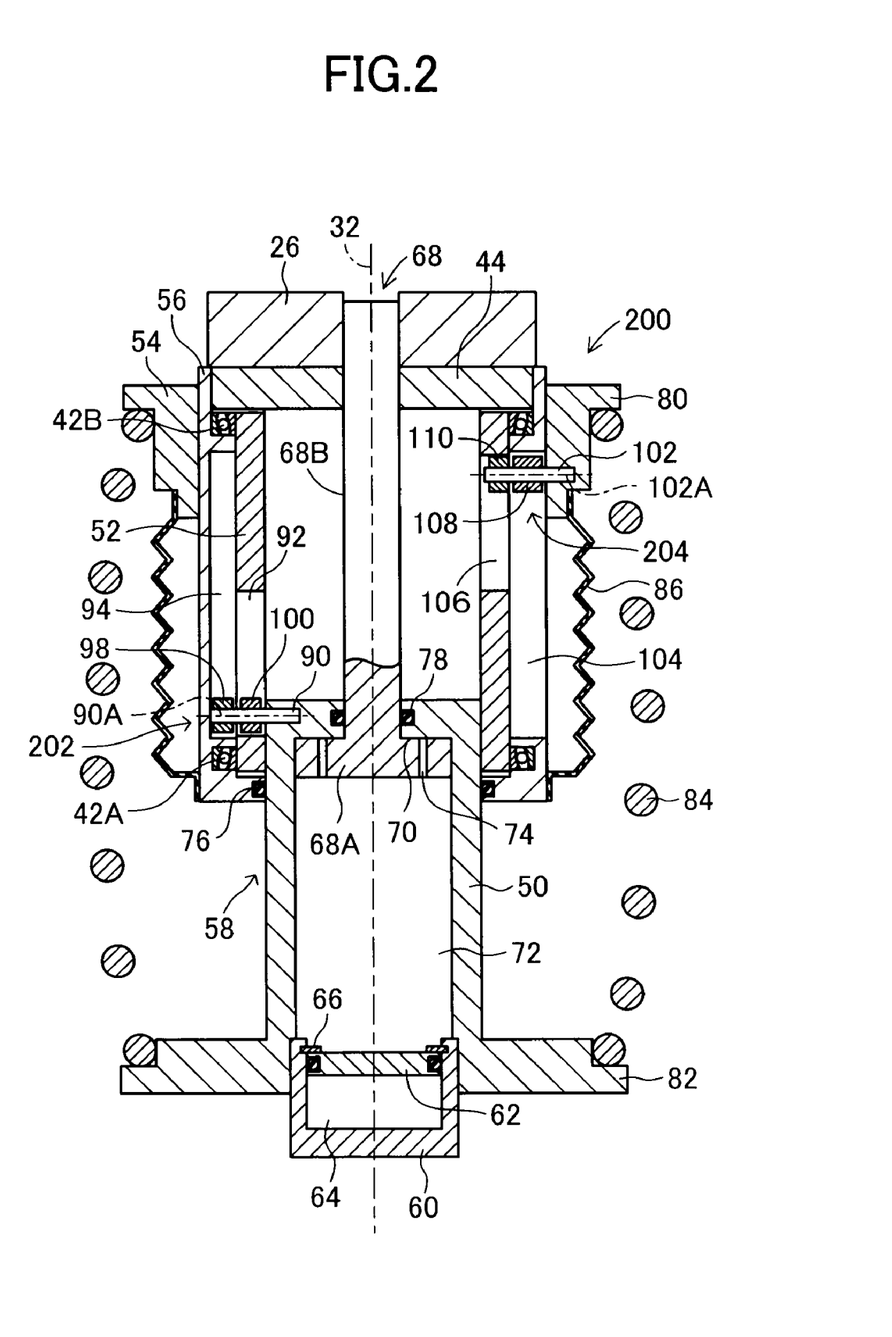
FIG. 2 is a sectional view cut along two cutting planes which are in contact with each other at right angles on the axis, showing a motion transmission apparatus incorporated in the embodiment shown in FIG. 1.
Figure 3:
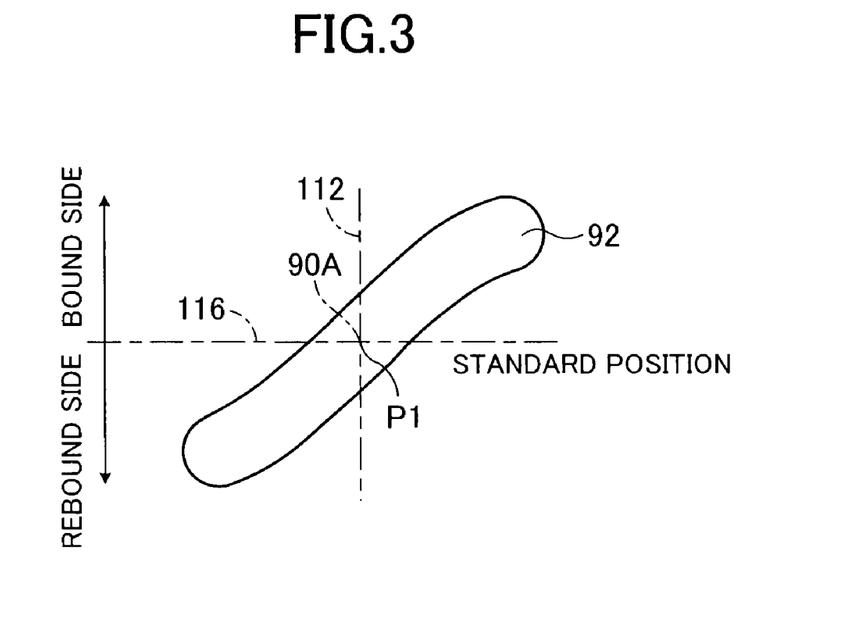
FIG. 3 is a partial development view in which a region of a cam groove of a first transmission means of an intermediate rotor of the motion transmission apparatus shown in FIG. 2 is developed on a plane.
Figure 4:
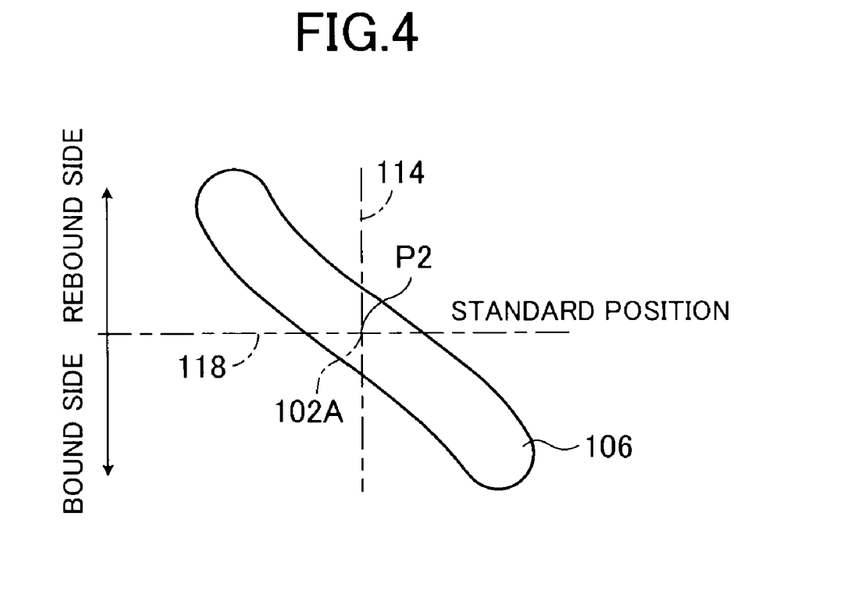
FIG. 4 is a partial development view in which a region of a cam groove of a second transmission means of the intermediate rotor of the motion transmission apparatus shown in FIG. 2 is developed on a plane.

FIG. 1 is an explanatory view showing an embodiment of a vehicular suspension according to the present invention and configured as a double-wishbone-type suspension; FIG. 2 is a sectional view cut along two cutting planes which are in contact with each other at right angles on the axis, showing a motion transmission apparatus incorporated in the embodiment shown in FIG. 1; FIG. 3 is a partial development view in which a region of a cam groove of a first transmission device of an intermediate rotor of the motion transmission apparatus shown in FIG. 2 is developed on a plane; and FIG. 4 is a partial development view in which a region of a cam groove of a second transmission device of the intermediate rotor of the motion transmission apparatus shown in FIG. 2 is developed on a plane.

In FIG. 1, reference numeral 2 denotes an entire suspension configured according to the present invention and adapted to suspend a wheel 4. The wheel 4 is supported by a wheel support member 6 in such a manner as to be rotatable about an axis of rotation 8. The suspension shown in FIG. 1 is a double-wishbone-type suspension. Outer ends of an upper arm 14 and a lower arm 16 are pivotally attached to upper and lower ends of the wheel support member 6 by means of ball joints 10 and 12, respectively. Inner ends of the upper arm 14 and the lower arm 16 are pivotally attached to a vehicle body 22 by means of rubber bush devices 18 and 20, respectively. A motion transmission apparatus 200 is disposed between the lower arm 16 and the vehicle body 22. Upper and lower ends of the motion transmission apparatus 200 are pivotally attached to the vehicle body 22 and the lower arm 16 by means of an upper mount 26 and a ball joint 28, respectively.

As shown in FIG. 2, the motion transmission apparatus 200 has a first transmission means 202 and a second transmission means 204, which are spaced apart from each other along an axis 32. The first transmission means 202 has an input piston 50, which is reciprocally movable along the axis 32, and an intermediate rotor 52, which is rotatable about the axis 32. The second transmission means 204 has the intermediate rotor 52 and an output piston 54, which is reciprocally movable along the axis 32.

The intermediate rotor 52 is supported at the inside of a housing 56 by angular bearings 42A and 42B in such a manner as to be rotatable about the axis 32 in relation to the housing 56. The output piston 54 assumes such a cylindrical shape as to be fitted to and surround the housing 56, and is supported in such a manner as to be reciprocally movable along the axis 32 in relation to the housing 56. An end cap 44 is fixed to the upper end of the housing 56 by means of press fit or the like. The end cap 44 is connected to the vehicle body 22 via the upper mount 26 fixed to the end cap 44.

The input piston 50 is fitted into the intermediate rotor 52 and is supported by the housing 56 and the intermediate rotor 52 in such a manner as to be reciprocally movable along the axis 32 in relation to the intermediate rotor 52. In the illustrated embodiment, the motion transmission apparatus 200 is a suspension stroke transmission apparatus in which a shock absorber is incorporated. The input piston 50 assumes a downwardly open cylindrical shape and functions as a cylinder of a shock absorber 58.

An end cap 60 is fixed to the lower end of the input piston 50 by means of press fit or the like and assumes an upwardly open closed-bottomed cylindrical shape. A free piston 62 is disposed within the end cap 60 in such a manner as to be reciprocally movable along the axis 32. The free piston 62 defines a gas chamber 64 in cooperation with the end cap 60. A high-pressure gas is sealed in the gas chamber 64. A C-ring 66 is attached to the inner surface of the upper end of the end cap 60. The C-ring 66 prevents the free piston 62 from moving upward beyond the same. Although unillustrated in FIG. 2, the ball joint 28 is provided at the lower end of the end cap 60.

The input piston 50 receives a piston 68 of the shock absorber 58 in such a manner that the piston 68 is reciprocally movable along the axis 32. The piston 68 defines a cylinder upper chamber 70 and a cylinder lower chamber 72 in cooperation with the input piston 50. A viscous liquid, such as oil, is sealed in the cylinder upper chamber 70 and the cylinder lower chamber 72. In FIG. 2, the motion transmission apparatus 200 is in a free state; i.e., in a state in which the weight of a vehicle body is not imposed between the upper mount 26 and the input piston 50. In the free state, the piston 68 of the shock absorber 58 is in a most expanded state in relation to the input piston 50, which serves as a cylinder for the piston 68; accordingly, the volume of the cylinder upper chamber 70 is zero.

A piston portion 68A of the piston 68 has a plurality of orifices 74 for allowing communication between the cylinder upper chamber 70 and the cylinder lower chamber 72. A rod portion 68B of the piston 68 extends upward through the end wall of the input piston 50 along the axis 32 and is connected at its upper end to the upper mount 26. An O-ring seal 76 is disposed between the input piston 50 and the housing 56. An O-ring seal 78 is disposed between the input piston 50 and the rod portion 68B of the piston 68.

The upper end of the output piston 54 has an integrally formed upper spring seat 80, which projects radially outward and extends annularly around the axis 32. The lower end of the input piston 50 has an integrally formed lower spring seat 82, which projects radially outward and extends annularly around the axis 32. A compression coil spring 84, which serves as a suspension spring, is elastically attached between the upper spring seat 80 and the lower spring seat 82 while surrounding the motion transmission apparatus 200 and extending along the axis 32.

A dust boot 86 is disposed at the outside of the motion transmission apparatus 200 and at the inside of the compression coil spring 84 in order to prevent entry of foreign matter, such as dust and muddy water, into the motion transmission apparatus 200. The dust boot 86 is connected at its upper end to the lower end of the output piston 54 and at its lower end to the lower end of the housing 56. Although unillustrated in FIG. 2, a stopper is provided at the upper end of the housing 56 so as to restrict upward movement, in FIG. 2, of the output piston 54; and accordingly, upward movement of the upper spring seat 80 as well.

When the wheel support member 6 moves vertically in association with bounds and rebounds of the wheel 4, the lower arm 16 pivotally moves about its inner end in a vertical direction. Accordingly, the lower arm 16 is a suspension member which moves vertically in association with bounds and rebounds of the wheel 4. The compression coil spring 84 is a suspension spring disposed between the vehicle body 22 and the lower arm 16, and serves as a suspension member. The upper spring seat 80 is a first support member for supporting an end portion of the suspension spring located on a side toward the vehicle body 22. The lower spring seat 82 is a second support member for supporting an end portion of the suspension spring located on a side toward the lower arm 16.

The first transmission means 202 has load transmission rods 90, which are supported in a cantilever fashion by the upper end of the input piston 50 by means of press fit or the like at positions spaced 180° apart from each other about the axis 32, and which extend radially outward. Distal end portions of the load transmission rods 90 extend through cam grooves 92 provided in the intermediate rotor 52 and into guide grooves 94 provided in a cylindrical portion of the housing 56. The distal end portions of the load transmission rods 90 support substantially spherical guide rollers 98 and cam rollers 100 in such a manner that the guide rollers 98 and the cam rollers 100 are rotatable about axes 90A of the load transmission rods 90. The guide rollers 98 are rollably engaged with wall surfaces of the corresponding guide grooves 94. The cam rollers 100 are rollably engaged with wall surfaces of the corresponding cam grooves 92.

Similarly, the second transmission means 204 has load transmission rods 102, which are supported in a cantilever fashion by a lower end portion of the output piston 54 by means of press fit or the like at positions spaced 180° apart from each other about the axis 32, and which extend radially outward. Distal end portions of the load transmission rods 102 extend through guide grooves 104 provided in the cylindrical portion of the housing 56 and into cam grooves 106 provided in the intermediate rotor 52. The distal end portions of the load transmission rods 102 support substantially spherical guide rollers 108 and cam rollers 110 in such a manner that the guide rollers 108 and the cam rollers 110 are rotatable about axes 102A of the load transmission rods 102. The guide rollers 108 are rollably engaged with wall surfaces of the corresponding guide grooves 104. The cam rollers 110 are rollably engaged with wall surfaces of the corresponding cam grooves 106.

In FIGS. 3 and 4, reference numerals 112 and 114 denote reference lines of the cam grooves 92 and 106, respectively, with respect to the direction of the axis 32. Reference numerals 116 and 118 denote reference lines of the cam grooves 92 and 106, respectively, with respect to a circumferential direction. As shown in FIG. 3, the cam groove 92 assumes a shape resembling the letter S. As shown in FIG. 4, the cam groove 106 assumes a shape resembling the inverted letter S such that the inclination direction of the cam groove 106 is the reverse of that of the cam groove 92. FIG. 2 shows the motion transmission apparatus 200 in a state in which a compressive force is not imposed on the motion transmission apparatus 200. However, when the vehicle carries a standard carrying load, and the wheel 4 is positioned at its neutral position; i.e., the wheel 4 neither bounds nor rebounds, the axes 90A and 102A of the load transmission rods 90 and 102 are positioned at central standard positions of the cam grooves 92 and 106, respectively; i.e., at intersections P1 and P2 of the reference lines 112 and 114 and the reference lines 116 and 118, respectively.

In FIGS. 3 and 4, a portion of the cam groove 92 located above the reference line 116 corresponds to a bound stroke of the wheel 4, and a portion of the cam groove 92 located below the reference line 116 corresponds to a rebound stroke of the wheel 4. By contrast, a portion of the cam groove 106 located above the reference line 118 corresponds to a rebound stroke of the wheel 4, and a portion of the cam groove 106 located below the reference line 118 corresponds to a bound stroke of the wheel 4.

As shown in FIG. 3, the cam groove 92 extends while being inclined with respect to the reference lines 112 and 116 and is curved such that, as the distance from the intersection P1 increases, an angle of inclination with respect to the circumferential reference line 116 gradually decreases. Particularly, in the range of distance from the intersection P1 which corresponds to an area of a bound stroke and a rebound stroke of the wheel 4 excluding terminal areas of the bound and rebound strokes, a portion of the cam groove 92 located on a side toward a bound of the wheel 4 is set larger in angle of inclination with respect to the circumferential reference line 116 than is a portion of the cam groove 92 located on a side toward a rebound of the wheel 4. However, in the ranges of distance from the intersection P1 which correspond to the terminal areas of a bound stroke and a rebound stroke of the wheel 4, a portion of the cam groove 92 located on the side toward a bound of the wheel 4 is set smaller in angle of inclination with respect to the circumferential reference line 116 than is a portion of the cam groove 92 located on the side toward a rebound of the wheel 4.

As is apparent from comparison between FIG. 3 and FIG. 4, the cam groove 106 assumes a form obtained by inverting the cam groove 92 with respect to the reference line 112 and reversing the direction of curve. Accordingly, the cam groove 106 assumes a form obtained by rotating the cam groove 92 90° counterclockwise about the intersection P1.

Specifically, as shown in FIG. 4, the cam groove 106 extends while being inclined with respect to the reference lines 114 and 118 in the reverse direction of the cam groove 92 and is curved such that, as the distance from the intersection P2 increases, an angle of inclination with respect to the circumferential reference line 118 gradually increases. Particularly, in the range of distance from the intersection P2 which corresponds to an area of a bound stroke and a rebound stroke of the wheel 4 excluding terminal areas of the bound and rebound strokes, a portion of the cam groove 106 located on a side toward a bound of the wheel 4 is set smaller in angle of inclination with respect to the circumferential reference line 118 than is a portion of the cam groove 106 located on a side toward a rebound of the wheel 4. However, in the ranges of distance from the intersection P2 which correspond to the terminal areas of a bound stroke and a rebound stroke of the wheel 4, a portion of the cam groove 106 located on the side toward a bound of the wheel 4 is set larger in angle of inclination with respect to the circumferential reference line 118 than is a portion of the cam groove 106 located on the side toward a rebound of the wheel 4.

Each of the cam rollers 100 can move only in the cam groove 92 along an S-shaped motion locus, which is inclined with respect to the reference lines 112 and 116, except for rotary motion about the load transmission rod 90. Similarly, each of the cam rollers 110 can move only in the cam groove 106 along an S-shaped motion locus, which is inclined with respect to the reference lines 114 and 118, except for rotary motion about the load transmission rod 102.

In the illustrated embodiment, when the lower arm 16 pivotally moves upward about its inner end in association with bound of the wheel 4, and the input piston 50 rectilinearly moves upward along the axis 32 in relation to the intermediate rotor 52 and the housing 56, the first transmission means 202 converts a rectilinear motion of the input piston 50 to a rotary motion about the axis 32 and transmits the rotary motion to the intermediate rotor 52. Since the cam grooves 92 and 106 are curved into a shape resembling the letter S as mentioned above, the second transmission means 204 converts the rotary motion of the intermediate rotor 52 to a rectilinear motion that is the reverse of the rectilinear motion of the input piston 50, and transmits the reverse rectilinear motion to the output piston 54. Consequently, the upper spring seat 80 is displaced downward in relation to the housing 56.

When the lower arm 16 pivotally moves downward about its inner end in association with rebound of the wheel 4, and the input piston 50 rectilinearly moves downward along the axis 32 in relation to the intermediate rotor 52 and the housing 56, the first transmission means 202 and the second transmission means 204 perform conversion and transmission of motion in a manner similar to that in the case of bound of the wheel 4 except that the direction of rotary motion of the intermediate rotor 52 and the direction of rectilinear motion of the output piston 54 are reversed. Consequently, the upper spring seat 80 is displaced upward in relation to the housing 56.

Figure 5:
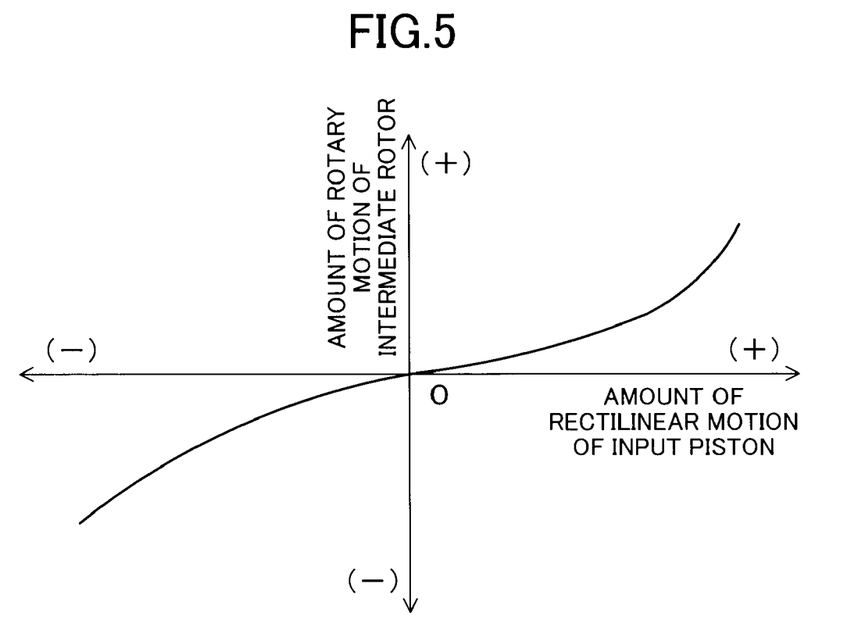
FIG. 5 is a graph showing the relation between the amount of rectilinear motion of an input piston and the amount of rotary motion of an intermediate rotor in the embodiment.
Figure 6:
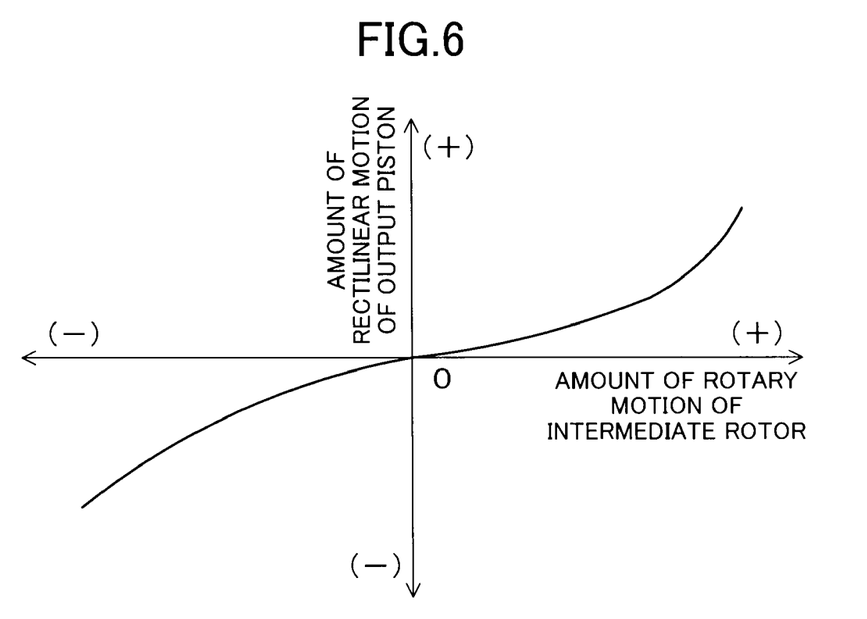
FIG. 6 is a graph showing the relation between the amount of rotary motion of the intermediate rotor and the amount of rectilinear motion of an output piston in the embodiment.
Figure 7:
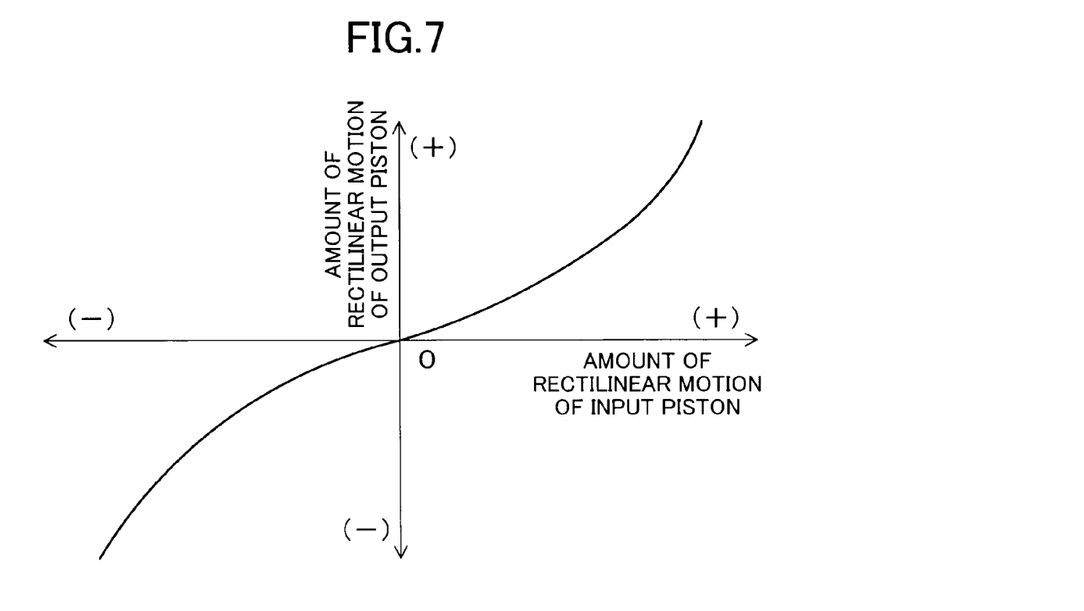
FIG. 7 is a graph showing the relation between the amount of rectilinear motion of an input piston and the amount of rectilinear motion of the output piston in the embodiment.

Accordingly, when the directions of motions of members at the time of bound of the wheel 4 are taken as positive directions, the relation between the amount of rectilinear motion of the input piston 50 and the amount of rotary motion of the intermediate rotor 52 becomes as shown in FIG. 5. Also, the relation between the amount of rotary motion of the intermediate rotor 52 and the amount of rectilinear motion of the output piston 54 becomes as shown in FIG. 6. Thus, the relation between the amount of rectilinear motion of the input piston 50 and the amount of rectilinear motion of the output piston 54 becomes as shown in FIG. 7. In either case of bound and rebound of the wheel 4, the rate of increase in the amount of rectilinear motion of the output piston 54 gradually increases with the amount of rectilinear motion of the input piston 50.

In the case of bound of the wheel 4, the input piston 50 moves upward, and thus the lower spring seat 82 also moves upward; however, the upper spring seat 80 moves downward in relation to the housing 56. Thus, as compared with the case where the upper spring seat 80 does not move downward, the amount of compressive deformation of the compression coil spring 84 increases. By contrast, in the case of rebound of the wheel 4, the input piston 50 moves downward, and thus the lower spring seat 82 also moves downward; however, the upper spring seat 80 moves upward in relation to the housing 56. Thus, as compared with the case where the upper spring seat 80 does not move upward, the amount of decrease in the amount of compressive deformation of the compression coil spring 84 increases.

Figure 8:
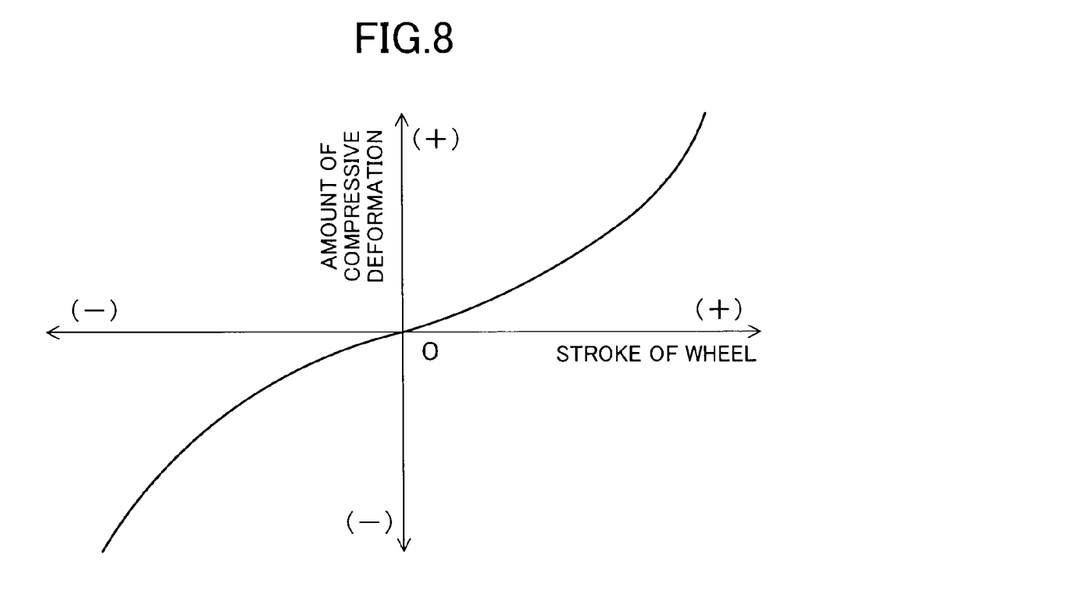
FIG. 8 is a graph showing the relation between the stroke of a wheel and the amount of elastic deformation of a compression coil spring in the embodiment.

Accordingly, the relation between a stroke of the wheel 4 and the amount of compressive deformation of the compressive coil spring 84 becomes as shown in FIG. 8. Specifically, in the case of bound of the wheel 4, as a bound stroke of the wheel 4 from the neutral position increases, the amount of compressive deformation of the compression coil spring 84 gradually increases, and the rate of increase in the amount of compressive deformation of the compression coil spring 84 also gradually increases. In the case of rebound of the wheel 4, as a rebound stroke of the wheel 4 from the neutral position increases, the amount of compressive deformation of the compression coil spring 84 gradually decreases, and the rate of decrease in the amount of compressive deformation of the compression coil spring 84 gradually increases.

As is apparent from comparison between the first quadrant and the third quadrant of FIG. 8, in an area of a bound stroke and a rebound stroke of the wheel 4 excluding terminal areas of the bound and rebound strokes, the rate of increase in the amount of compressive deformation of the compressive coil spring 84 in association with increase in the bound stroke of the wheel 4 is lower than the magnitude of the rate of decrease in the amount of compressive deformation of the compression coil spring 84 in association with increase in the rebound stroke of the wheel 4. By contrast, in the terminal areas of a bound stroke and a rebound stroke of the wheel 4, the rate of increase in the amount of compressive deformation of the compressive coil spring 84 in association with increase in the bound stroke of the wheel 4 is higher than the magnitude of the rate of decrease in the amount of compressive deformation of the compression coil spring 84 in association with increase in the rebound stroke of the wheel 4.

Thus, according to the illustrated embodiment, by means of appropriately setting the shapes of the cam grooves 92 and 106 according to desired spring characteristics of the suspension, a rectilinear motion and force can be transmitted from the input piston 50 to the output piston 54 with desired continuous, nonlinear transmission characteristics over the entire ranges of a bound stroke and a rebound stroke of the wheel 4. Thus, desired progressive spring characteristics can be implemented without subjection to restrictions associated with motion of a link mechanism of the suspension.

Figure 9:
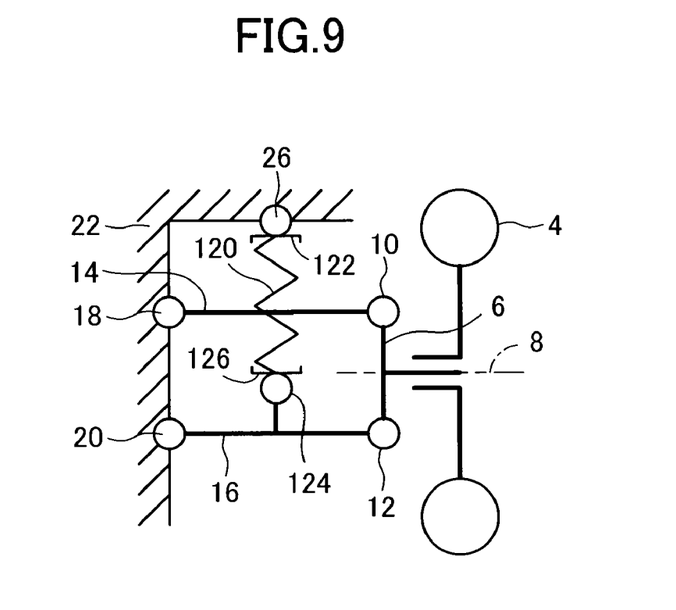
FIG. 9 is an explanatory view showing a conventional general double-wishbone-type suspension.

FIG. 9 shows a conventional general double-wishbone-type suspension. Members corresponding to those appearing in FIG. 1 are denoted by like reference numerals appearing in FIG. 1. In FIG. 9, a suspension spring 120 is elastically attached between an upper seat 122 fixed to the upper support 26 attached to the vehicle body 22 and a lower seat 126 fixed to a lower support 124 attached to the lower arm 16.

Figure 10:
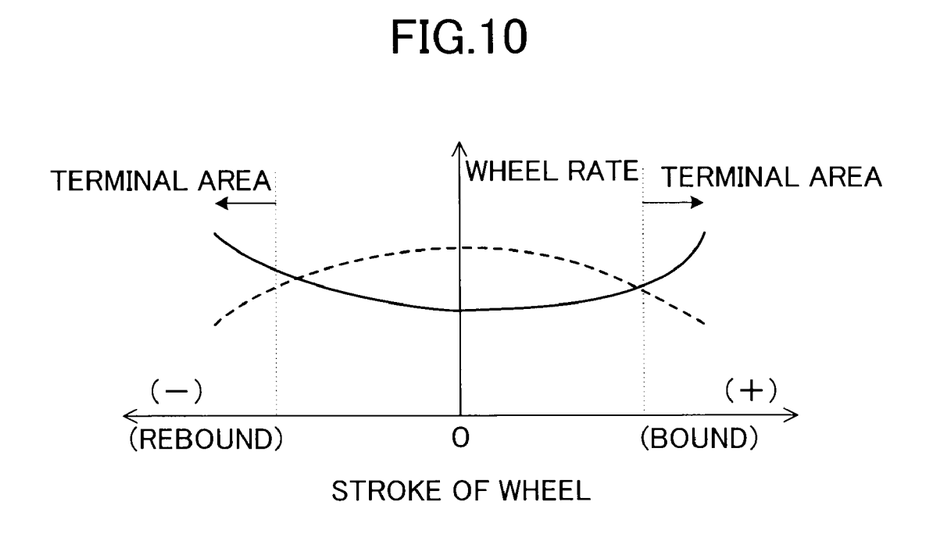
FIG. 10 is a graph showing the relation between the stroke of a wheel and the wheel rate with respect to the embodiment and the conventional general double-wishbone-type suspension.

Since the lower arm 16 pivotally moves about its inner end in a vertical direction in association with bounds and rebounds of the wheel 4, the lower seat 126 also moves in a vertical direction along an arcuate locus about the inner end of the lower arm 16. Thus, as a bound stroke and a rebound stroke of the wheel 4 increase, the ratio of the amount of change in the amount of elastic deformation of the suspension spring 120 to the amount of increase in stroke of the wheel 4 gradually decreases. Thus, the relation between a stroke of the wheel 4 and the wheel rate (spring constant for a spring force of the suspension spring 120 which acts on the position of the wheel 4) becomes an upwardly convex relation; for example, that indicated by the broken line in FIG. 10.

According to the illustrated embodiment, as a bound stroke of the wheel 4 increases, the rate of increase in the amount of elastic deformation of the compression coil spring 84 gradually increases. Also, as a rebound stroke of the wheel 4 increases, the rate of decrease in the amount of elastic deformation of the compression coil spring 84 gradually increases.

Thus, in either case of a bound stroke and a rebound stroke of the wheel 4, the wheel rate can be gradually increased with a stroke of the wheel 4. Accordingly, the relation between a stroke of the wheel 4 and the wheel rate can become a downwardly convex relation as indicated by the solid line in FIG. 10. Thus, as compared with conventional general suspensions, while good riding comfort is ensured during ordinary running, the amount of bound and rebound of a wheel is reduced at the time of turning, acceleration and deceleration, running on a rough road, etc., thereby reducing the degree of a postural change of a vehicle body. Therefore, running stability of a vehicle can be improved.

Particularly, according to the illustrated embodiment, in an area of a bound stroke and a rebound stroke of the wheel 4 excluding terminal areas of the bound and rebound strokes, the rate of increase in the amount of compressive deformation of the compressive coil spring 84 in association with increase in the bound stroke of the wheel 4 is lower than the magnitude of the rate of decrease in the amount of compressive deformation of the compression coil spring 84 in association with increase in the rebound stroke of the wheel 4. Accordingly, as compared with the case where the magnitude relation with respect to the rate of change in the amount of compressive deformation of the compression coil spring 84 in association with increase in a stroke of the wheel 4 is the reverse of that of the embodiment, while a spring force functioning as a rebound acceleration force at the time of rebound of a wheel is reduced to thereby effectively restrain a postural change of a vehicle body at the time of turning and acceleration and deceleration, a spring force functioning as resistance at the time of bound of a wheel caused by a force from a road surface is reduced, whereby good riding comfort of a vehicle can be ensured.

According to the illustrated embodiment, in the terminal areas of a bound stroke and a rebound stroke of the wheel 4, the rate of increase in the amount of compressive deformation of the compressive coil spring 84 in association with increase in the bound stroke of the wheel 4 is higher than the magnitude of the rate of decrease in the amount of compressive deformation of the compression coil spring 84 in association with increase in the rebound stroke of the wheel 4. Accordingly, an excessive bound of a wheel can be effectively restrained, so that the size of a bound stopper can be reduced, or the bound stopper can be eliminated. Also, when a wheel bounds with a high stroke velocity, a shock caused by hitting against the bound stopper can be reduced.

According to the illustrated embodiment, the motion transmission apparatus 200 is a suspension stroke transmission apparatus in which a shock absorber is incorporated. The input piston 50 functions as a cylinder of the shock absorber 58. Also, the compression coil spring 84, the upper spring seat 80, and the lower spring seat 82, together with the motion transmission apparatus 200, constitute a single unit. Thus, as compared with a structure in which a shock absorber is not incorporated in a motion transmission apparatus, and the case where the compression coil spring 84, the upper spring seat 80, and the lower spring seat 82, together with the motion transmission apparatus 200, do not constitute a single unit, improvement can be achieved in the mountability of the motion transmission apparatus, the shock absorber, and the compression coil spring 84 in a vehicle.

According to the above-described embodiment, the input piston 50 serving as an input member, the intermediate rotor 52 serving as an intermediate member, and the output piston 54 serving as an output member are aligned with the axis 32 and fitted to each other in such a manner as to move along the axis 32 in relation to one another. Thus, as compared with a structure in which the input member and the output member move rectilinearly along different axes and a structure in which the input member or the output member is not fitted to the intermediate member, the axial length of the motion transmission apparatus can be reduced, so that the motion transmission apparatus can be reliably rendered compact.

According to the above-described embodiment, the first transmission means 202 and the second transmission means 204 are provided; the first transmission means 202 gradually increases the ratio of the amount of rotary motion of the intermediate rotor 52 to the amount of rectilinear motion along the axis 32 of the input piston 50 with the amount of rectilinear motion of the input piston 50; and the second transmission means 204 gradually increases the ratio of the amount of rectilinear motion along the axis 32 of the output piston 54 to the amount of rotary motion of the intermediate rotor 52 with the amount of rotary motion of the intermediate rotor 52. Thus, as compared with a structure in which only one of the first transmission means 202 and the second transmission means 204 gradually increases the ratio of the amount of motion of a motion transmission target member to the amount of motion of a motion transmission source member with the amount of motion of the motion transmission source member, the degree of curve of the cam grooves can be reduced, whereby the first transmission means 202 and the second transmission means 204 can smoothly conduct the conversion of motion and the transmission of a reaction force.

According to the above-described embodiment, the first guide grooves 94 are provided for guiding the load transmission rods 90 of the first transmission means 202 along the axis 32, and the second guide grooves 104 are provided for guiding the load transmission rods 102 of the second transmission means 204 along the axis 32. Thus, as compared with a structure in which the guide grooves are not provided, the rotation of the input piston 50 and the output piston 54 about the axis 32 can be reliably prevented. Therefore, the transmission of rectilinear motion and force between the input piston 50 and the output piston 54 can reliably and accurately have a desired nonlinear characteristic.

According to the above-described embodiment, a plurality of movable members, such as the input piston 50, are disposed in such a manner as to be aligned with the axis 32, and move along or about the axis 32. Thus, as compared with a structure in which the plurality of movable members are disposed in such a manner as to be aligned with different respective axes, the structure of the motion transmission apparatus 200 can be simplified, and the transmission of motion and force can be optimally conducted.

While the present invention has been described in detail with reference to the above particular embodiment, it will be apparent to those skilled in the art that the present invention is not limited thereto, but may be embodied in various other forms without departing from the scope of the invention.

For example, in the above-described embodiment, the first transmission means 202 gradually increases the ratio of the amount of rotary motion of the intermediate rotor 52 to the amount of rectilinear motion along the axis 32 of the input piston 50 with the amount of rectilinear motion of the input piston 50, and the second transmission means 204 gradually increases the ratio of the amount of rectilinear motion along the axis 32 of the output piston 54 to the amount of rotary motion of the intermediate rotor 52 with the amount of rotary motion of the intermediate rotor 52. However, for example, this structure may be modified as follows: by means of either the cam grooves 92 or the cam grooves 106 being straight cam grooves, only one of the first transmission means 202 and the second transmission means 204 gradually increases the ratio of the amount of motion of a motion transmission target member to the amount of motion of a motion transmission source member with the amount of motion of the motion transmission source member.

In the above-described embodiment, the cam groove 106 assumes a form obtained by rotating the cam groove 92 90° counterclockwise about the intersection P1; thus, there is employed the same rate at which the first transmission means 202 gradually increases the ratio of the amount of rotary motion of the intermediate rotor 52 to the amount of rectilinear motion along the axis 32 of the input piston 50 with the amount of rectilinear motion of the input piston 50 and at which the second transmission means 204 gradually increases the ratio of the amount of rectilinear motion along the axis 32 of the output piston 54 to the amount of rotary motion of the intermediate rotor 52 with the amount of rotary motion of the intermediate rotor 52. However, different rates may be employed.

For example, the rate at which the second transmission means 204 gradually increases the ratio of the amount of rectilinear motion along the axis 32 of the output piston 54 to the amount of rotary motion of the intermediate rotor 52 with the amount of rotary motion of the intermediate rotor 52 may be higher than the rate at which the first transmission means 202 gradually increases the ratio of the amount of rotary motion of the intermediate rotor 52 to the amount of rectilinear motion along the axis 32 of the input piston 50 with the amount of rectilinear motion of the input piston 50. In this case, with a given ratio of the amount of rectilinear motion along the axis 32 of the output piston 54 to the amount of rectilinear motion along the axis 32 of the input piston 50, as compared with the case where the two rates are the same or in the reverse magnitude relation, the amount of rotary motion of the intermediate rotor 52 can be reduced.

In the above-described embodiment, a rectilinear motion along the axis 32 of the output piston 54 and a rectilinear motion along the axis 32 of the input piston 50 are of opposite directions, and the output piston 54 reciprocally moves the upper spring seat 80. However, this structure may be modified as follows: a rectilinear motion along the axis 32 of the output piston 54 and a rectilinear motion along the axis 32 of the input piston 50 are of the same direction, and the output piston 54 reciprocally moves the lower spring seat 82 in relation to the upper spring seat 80 which is substantially attached to the vehicle body 22.

In the above-described embodiment, the motion transmission apparatus 200 is a suspension stroke transmission apparatus in which a shock absorber is incorporated. However, the suspension stroke transmission apparatus may be configured such that the shock absorber is a suspension member independent of the suspension stroke transmission apparatus.

Furthermore, the suspension of the above-described embodiment is a double-wishbone-type suspension. However, the suspension of the present invention may be a suspension of any type which is known in the technical field, such as a McPherson-strut-type suspension or a trailing-arm-type suspension.

The invention claimed is:

1. A vehicular suspension comprising:
   a suspension member which moves upward and downward in association with bound and rebound, respectively, of a wheel;
   a suspension spring disposed between a vehicle body and the suspension member;
   a first support member and a second support member for supporting an end portion of the suspension spring located on a side toward the vehicle body and an end portion of the suspension spring located on a side toward the suspension member, respectively; and motion transmission means for varying an amount of elastic deformation of the suspension spring by converting a vertical motion of the suspension member to a relative motion between the first and second support members in a form of a change in distance between the first support member and the second support member and transmitting the relative motion to one of the first support member and the second support member, a position of the suspension member at the time of the wheel being positioned at a neutral position is taken as a standard position, and, in both upward motion and downward motion from the standard position of the suspension member, the motion transmission means continuously and non-linearly increases the ratio of the amount of the relative motion to the amount of motion of the suspension member with the amount of motion of the suspension member.

2. A vehicular suspension according to claim 1, wherein:
the motion transmission means includes an input member, an intermediate member, and an output member which are fitted to one another while being aligned with an axis and move in relation to one another while being aligned with the axis;
the motion transmission means includes first transmission means and second transmission means;
the vertical motion of the suspension member causes the input member to move rectilinearly along the axis;
the first transmission means converts a rectilinear motion along the axis of the input member to a rotary motion about the axis and transmits the rotary motion to the intermediate member;
the second transmission means converts the rotary motion about the axis of the intermediate member to a rectilinear motion along the axis and transmits the rectilinear motion to the output member; and
the output member transmits the rectilinear motion along the axis to one of the first support member and the second support member.

3. A vehicular suspension according to claim 2, wherein, when the wheel is positioned at the neutral position, the input member, the intermediate member, and the output member are positioned at their standard positions;
the first transmission means is configured to continuously and nonlinearly increase a ratio of an amount of rotary motion of the intermediate member to an amount of rectilinear motion of the input member with the amount of rectilinear motion from the standard position of the input member; and
the second transmission means is configured to continuously and nonlinearly increase a ratio of an amount of rectilinear motion of the output member to the amount of rotary motion of the intermediate member with the amount of rotary motion from the standard position of the intermediate member.

4. A vehicular suspension according to claim 2, wherein each of the first transmission means and the second transmission means includes a cam provided in a motion transmission source member and a cam follower provided in a motion transmission target member and engaged with the cam, and, by the cam follower following a profile of the cam, the ratio of the amount of motion of the motion transmission target member to the amount of motion of the motion transmission source member is increased continuously and nonlinearly with the amount of motion of the motion transmission source member.

5. A vehicular suspension according to claim 4, wherein one of the cam and the cam follower is a cam groove, whereas the other of the cam and the cam follower is a cam groove engagement member which is engaged with the cam groove and moves along the cam groove, and the cam groove of at least one of the first transmission means and the second transmission means extends while being inclined with respect to a circumferential direction about the axis and is curved such that an angle of inclination with respect to the circumferential direction varies gradually and continuously.

6. A vehicular suspension according to claim 2, wherein:
the motion transmission means includes a housing for accommodating the input member and the intermediate member therein;
the intermediate member is fitted to the input member to surround the input member about the axis, and supports the input member such that the input member is rectilinearly movable along the axis;
the housing is fitted to the intermediate member to surround the intermediate member about the axis, and supports the intermediate member such that the intermediate member is rotatable about the axis;
the output member is fitted to the housing to surround the housing about the axis, and is supported by the housing to be rectilinearly movable along the axis;
the first transmission means and the second transmission means include a first cam groove and a second cam groove, respectively, provided in the intermediate member;
a cam groove engagement member of the first transmission means and a cam groove engagement member of the second transmission means are provided in the input member and the output member, respectively;
the housing includes a first guide groove and a second guide groove which extend along the axis;
the cam groove engagement member of the first transmission means extends radially outward through the first cam groove and into the first guide groove and is engaged with the first guide groove to be movable along the first guide groove; and
the cam groove engagement member of the second transmission means extends radially inward through the second guide groove and into the second cam groove and is engaged with the second guide groove to be movable along the second guide groove.

7. A vehicular suspension according to claim 1, wherein, as viewed in a range of vertical motion of the suspension member excluding a terminal area of upward motion and a terminal area of downward motion of the suspension member, a rate of increase in the ratio between the amounts of motion in a case of upward motion from the standard position of the suspension member is lower than a rate of increase in the ratio between the amounts of motion in a case of downward motion from the standard position of the suspension member.

8. A vehicular suspension according to claim 1, wherein, as viewed in a terminal area of upward motion and a terminal area of downward motion of the suspension member, the rate of increase in the ratio between the amount of motion in the case of upward motion from the standard position of the suspension member is higher than the rate of increase in the ratio between the amounts of motion in the case of downward motion from the standard position of the suspension member.

9. A vehicular suspension according to claim 2, wherein one of the input member and the output member serves as a cylinder of a shock absorber, and the motion transmission means has the shock absorber incorporated therein.

10. A vehicular suspension according to claim 2, wherein:
the suspension spring is disposed in a compressed condition between the first support member and the second support member;
the output member moves rectilinearly in a direction opposite that of the input member; and
the output member transmits a rectilinear motion to the first support member.

11. A vehicular suspension according to claim 10, wherein the first support member is integrated with the output member, and the second support member is integrated with the input member.

12. A vehicular suspension according to claim 2, wherein:
the suspension spring is disposed in a compressed condition between the first support member and the second support member;
the output member moves rectilinearly in the same direction as that of the input member; and
the output member transmits a rectilinear motion to the second support member.

13. A vehicular suspension according to claim 12, wherein the first support member is supported by a vehicle body, and the second support member is integrated with the output member.

14. A vehicular suspension comprising:
a suspension member which moves upward and downward in association with bound and rebound, respectively, of a wheel;
a suspension spring disposed between a vehicle body and the suspension member;
a first support member and a second support member for supporting an end portion of the suspension spring located on a side toward the vehicle body and an end portion of the suspension spring located on a side toward the suspension member, respectively; and
motion transmission means for varying an amount of elastic deformation of the suspension spring by converting a vertical motion of the suspension member to a relative motion between the first and second support members in a form of a change in distance between the first support member and the second support member and transmitting the relative motion to one of the first support member and the second support member;
the motion transmission means includes an input member, an intermediate member, and an output member which are fitted to one another while being aligned with an axis and move in relation to one another while being aligned with the axis;
the motion transmission means includes first transmission means and second transmission means;
the vertical motion of the suspension member causes the input member to move rectilinearly along the axis;
the first transmission means converts a rectilinear motion along the axis of the input member to a rotary motion about the axis and transmits the rotary motion to the intermediate member;
the second transmission means converts the rotary motion about the axis of the intermediate member to a rectilinear motion along the axis and transmits the rectilinear motion to the output member; and
the output member transmits the rectilinear motion along the axis to one of the first support member and the second support member, and at least one of the first transmission means and the second transmission means continuously and nonlinearly varies a ratio of an amount of motion of a motion transmission target member to an amount of motion of a motion transmission source member according to motion of the motion transmission source member, thereby continuously and nonlinearly varying a ratio of an amount of the relative motion to an amount of motion of the suspension member according to the vertical motion of the suspension member.

* * * * *